July 16, 1946.  S. P. MATHERS  2,403,942
STACKING MACHINE
Filed Feb. 8, 1945   9 Sheets-Sheet 4
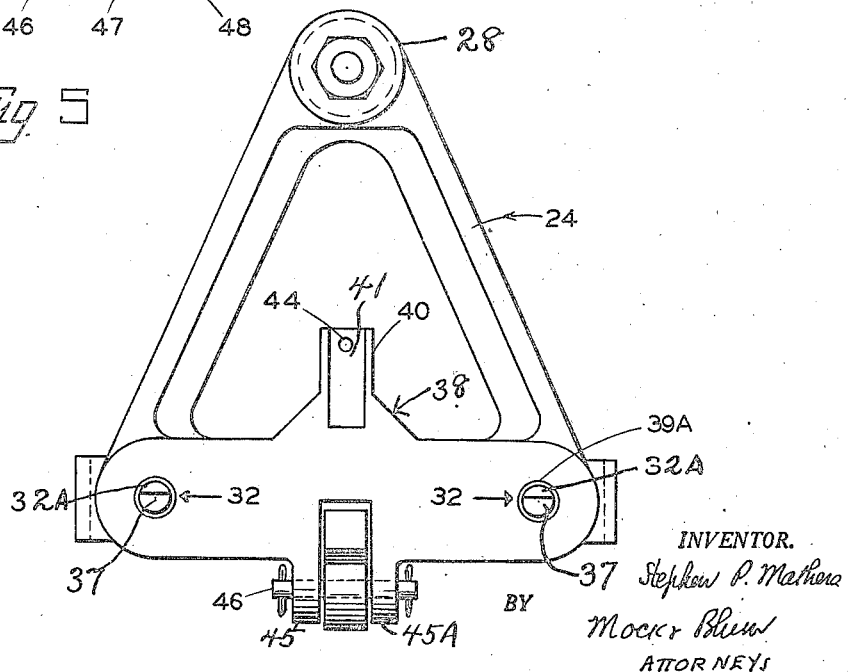

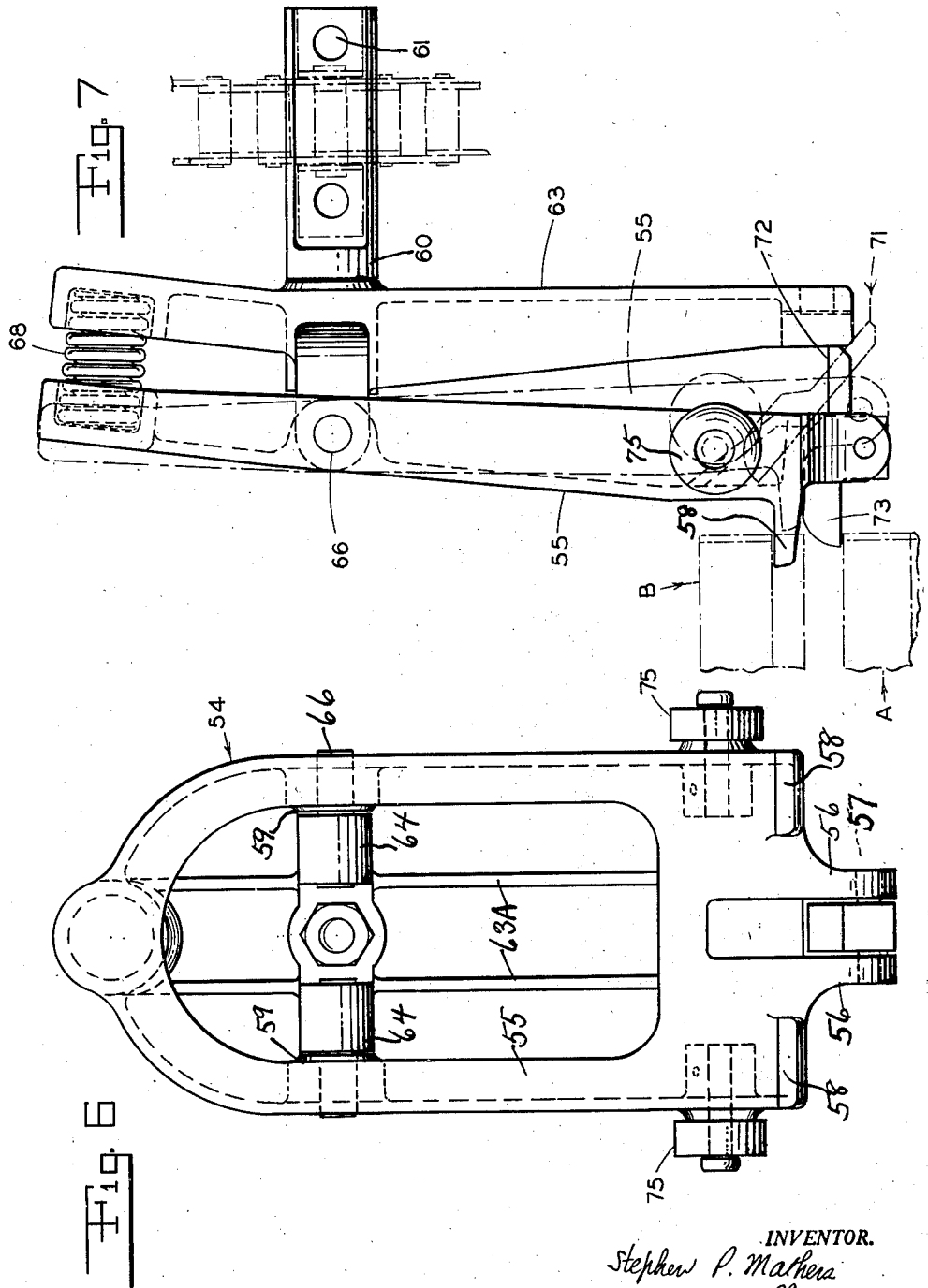

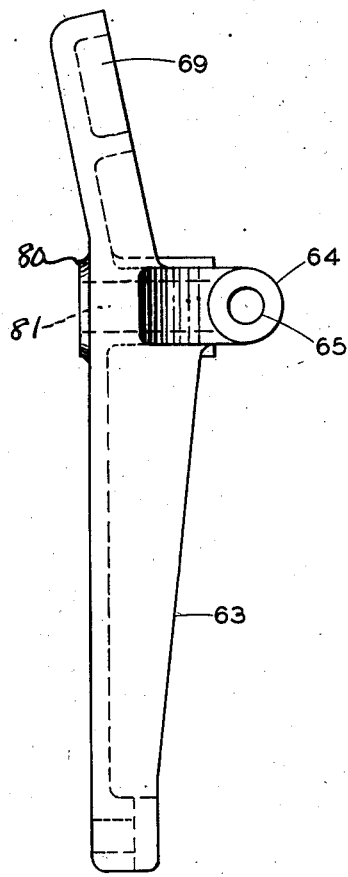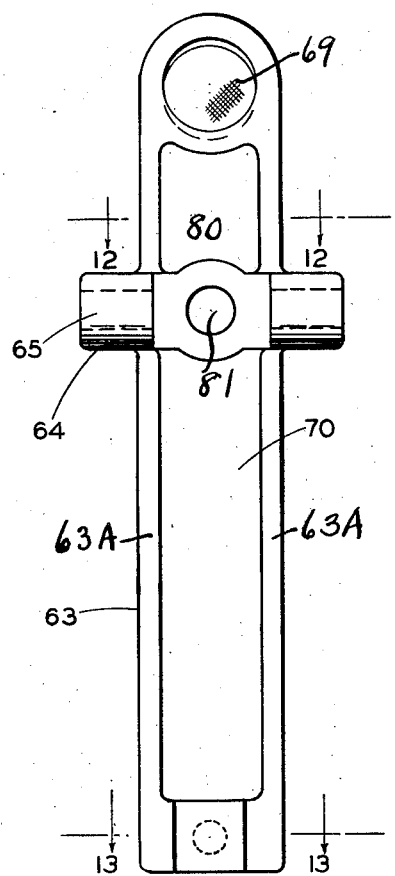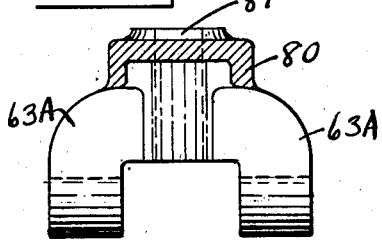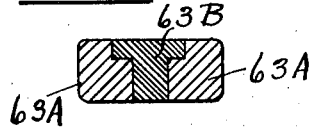

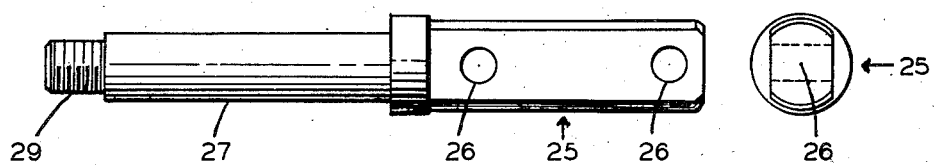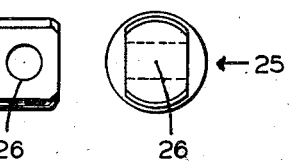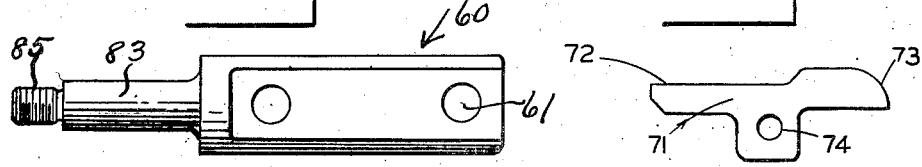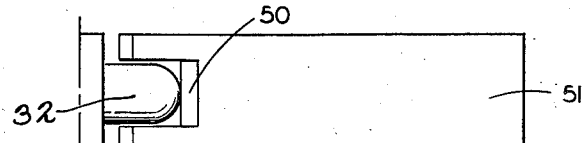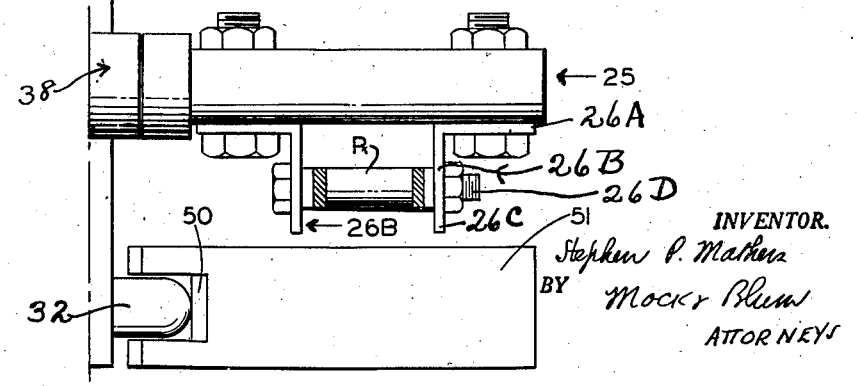

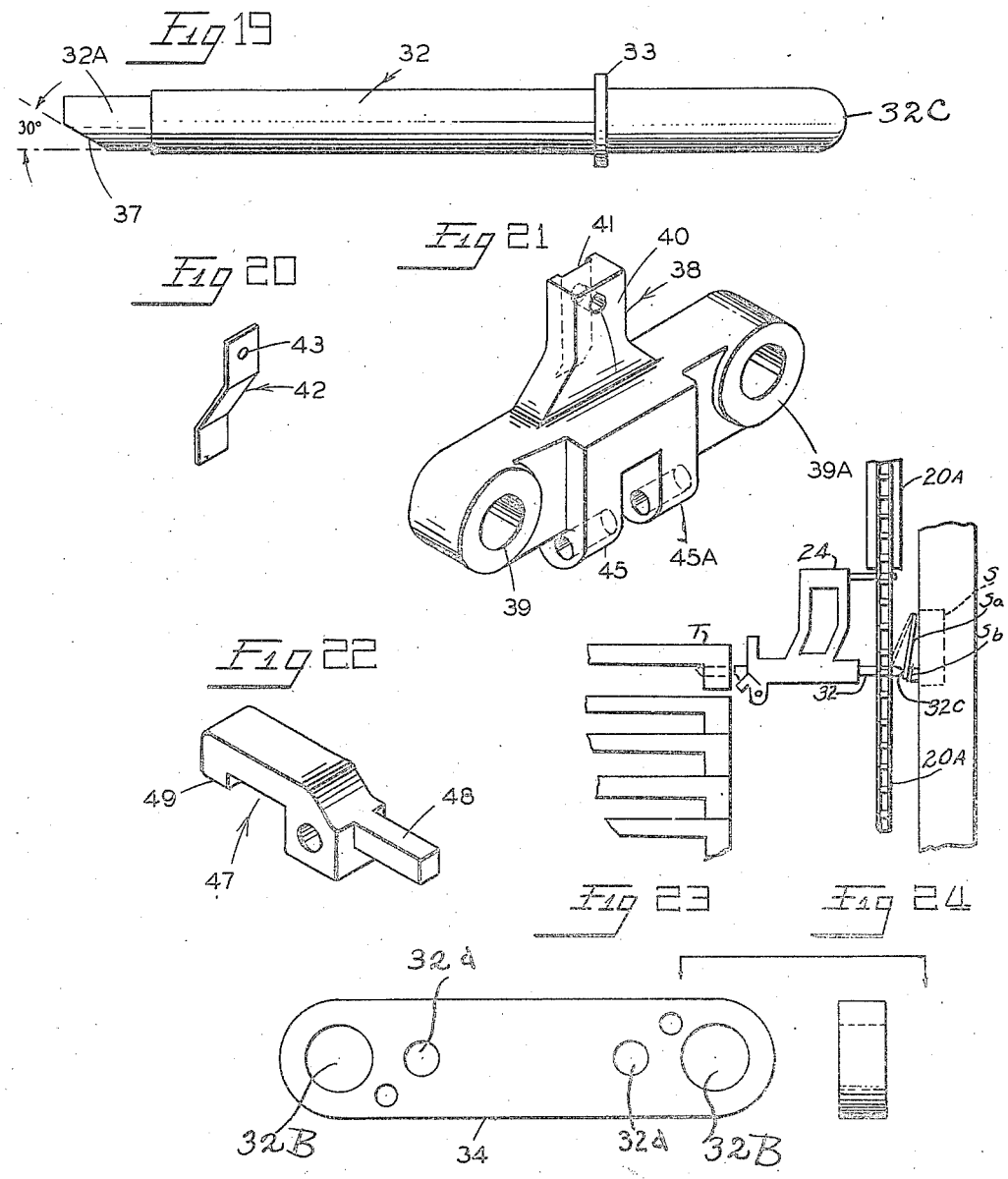

Patented July 16, 1946

2,403,942

UNITED STATES PATENT OFFICE 2,403,942

STACKING MACHINE

Stephen P. Mathers, Philadelphia, Pa., assignor to National Equipment Co., New York, N. Y., a copartnership Application February 8, 1945, Serial No. 576,887

5 Claims. (Cl. 214—6)

My invention relates to a new and improved stacking machine.

While the invention relates particularly to the stacking of trays which are used in connection with the manufacture of candies, it is not limited to any specific purpose, or to stacking any specific articles.

The invention relates to the type of machine which has two vertical endless chains, which have laterally alined front ascending vertical runs, and laterally alined rear descending vertical runs.

Some of the objects of my invention are to provide said laterally alined runs with holders for supporting the trays or other articles, said holders having supporting members which are moved laterally inwardly towards each other and laterally outwardly away from each other; to move said supporting members laterally inwardly towards each other, into operative position, below a loading station which is provided at the front ascending runs, so that said supporting members pick the object off the loading device; to stack the objects on a suitable support by unloading said objects from the rear descending runs, each object being released from its holders by the next preceding object in the stack; to release the objects from the holders by outwardly laterally moving said supporting members away from each other, and to operate a control by one of said outwardly moving supporting members, whereby the pile of stacked objects is moved automatically laterally away from the stacking station; and to provide a machine of simple and efficient design.

Numerous additional objects and advantages of my invention will be stated in the annexed description and drawings, which illustrate preferred embodiments thereof.

In Fig. 2, the bottom run of each conveyer chain is inclined downwardly, from front to rear.

Fig. 4 is a detail front elevation which shows the setting station which is located below the loading station, at the front of the machine. At said setting station, the supporting members are moved laterally inwardly towards each other, to be located in operative position, in order to pick up a tray. Said supporting members are releasably locked in said operative position and they remain locked until said supporting members are automatically moved laterally outwardly away from each other, to release the respective tray, at the rear of the machine.

Fig. 5 is a side elevation which shows a respective pair of supporting members, assembled with their holder or mount.

Fig. 6 is an elevation of the modified supporting member of the second embodiment, assembled with its holder or mount.

Fig. 7 is a side elevation of the assembled holder and supporting member of the second embodiment as shown in Fig. 6, showing how a holder is clamped to a respective link of a conveyer chain.

Figure 8:
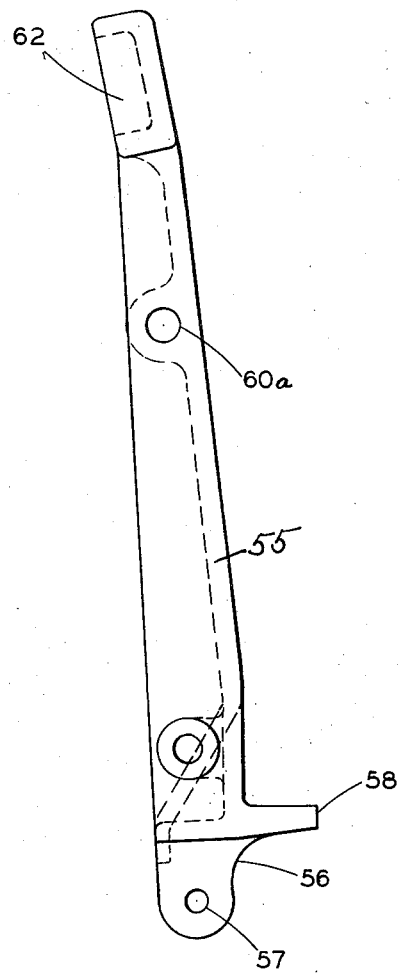

Fig. 8 is a side elevation of the supporting member which is shown in Fig. 6, detached from its holder or mount.

Figure 9:
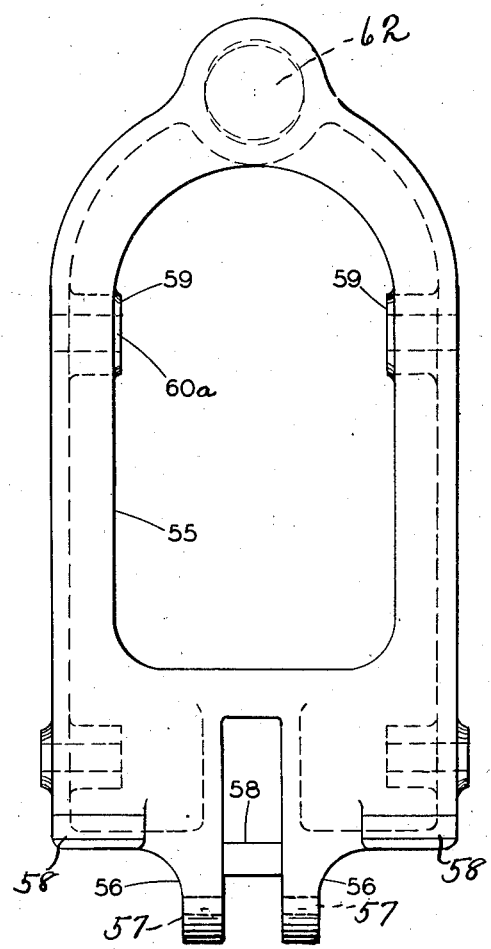

Fig. 9 is a front elevation of Fig. 8.

Fig. 10 is a side elevation of the holder or mount of the second embodiment, detached from its supporting member.

Fig. 11 is a front elevation of Fig. 10.

Figs. 12 and 13 are respectively sectional views on the lines 12—12 and 13—13 of Fig. 11.

Figure 1:
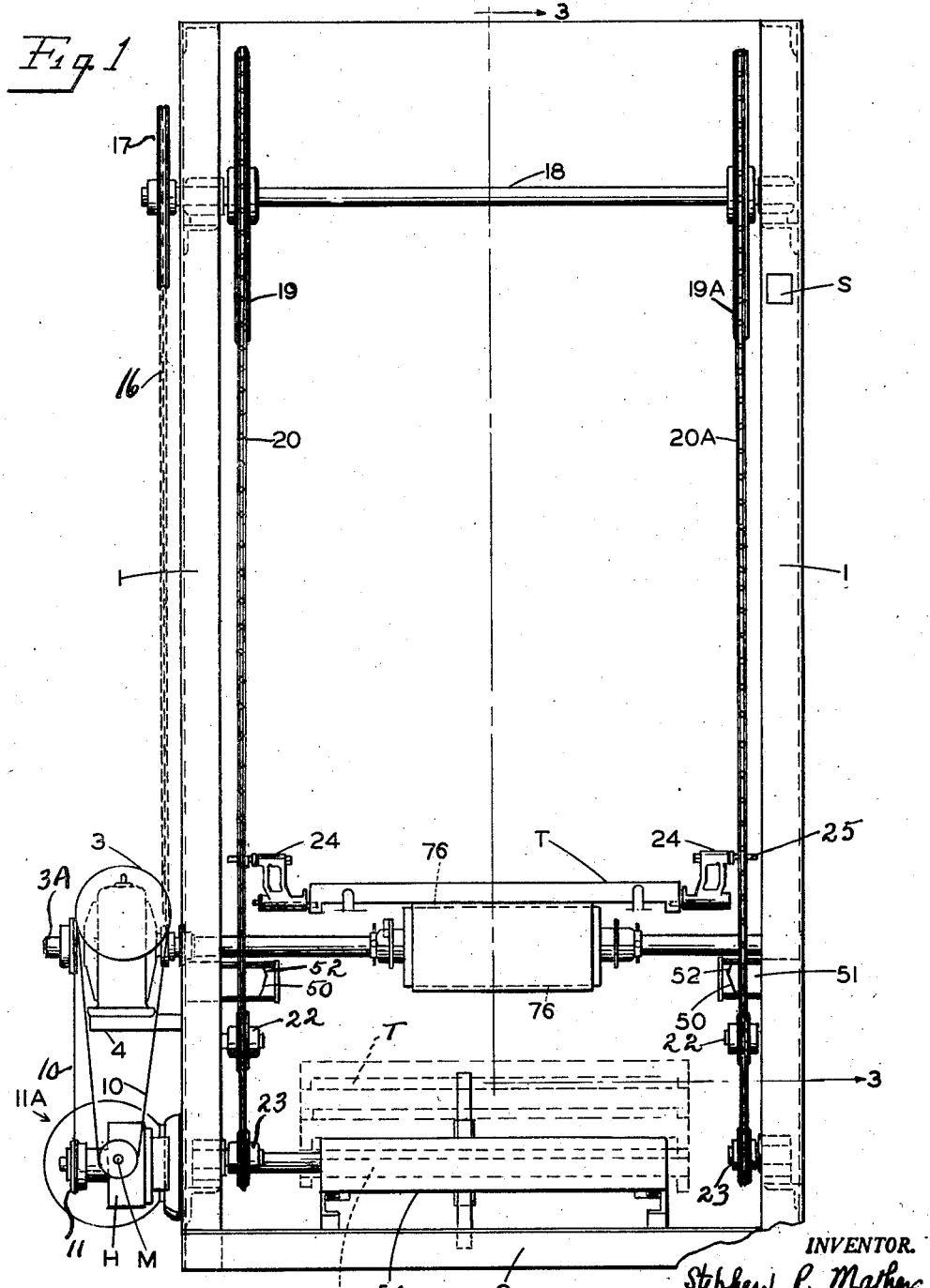
Fig. 1 is a front elevation of the first embodiment of the improved machine.

Fig. 14 is a side elevation of the coupling member which connects a holder or mount of the first embodiment, pivotally to a respective link of a conveyer chain, so that each holder can turn transversely, to-and-fro, relative to the respective link, about an axis which is parallel to the plane of Fig. 1.

Fig. 15 is an end elevation of Fig. 14, taken at the right of Fig. 14.

Fig. 16 shows a modification of Fig. 14. This modification is used in the second embodiment.

Fig. 17 is a side elevation of the trigger of the second embodiment.

Fig. 18 is a detail top view, taken along the line 18—18 of Fig. 4, which shows the means for connecting a coupling member rigidly to the respective link. It also shows the cam members at the setting station, whereby the supporting members are moved laterally inwardly towards each other, into operative position to pick up a tray or other object.

Fig. 19 is a side elevation of a supporting member of the first embodiment.

Fig. 20 is a perspective view of one of the clamping springs which are used to clamp each tray between the respective supporting members.

Fig. 21 is a perspective view of the mount or holder for a pair of supporting members, in the first embodiment.

Fig. 22 is a detail perspective view of one of the triggers of the first embodiment.

Fig. 23 is a front elevation of the supplemental slide-bearing for the supporting member of the first embodiment, said slide-bearing being fixed to a respective mount or holder.

Fig. 24 is a detail view which shows a switch S, which has a switch arm Sa which is biased to the broken-line position, and which can be turned to the full-line operative position to abut contact Sb.

Fig. 1 shows a frame which comprises uprights 1 and a base 2.

A lateral shaft 18 is turnably mounted in bearings which are fixed to uprights 1. Top sprockets 19 and 19A are fixed to shaft 18.

Figure 2:
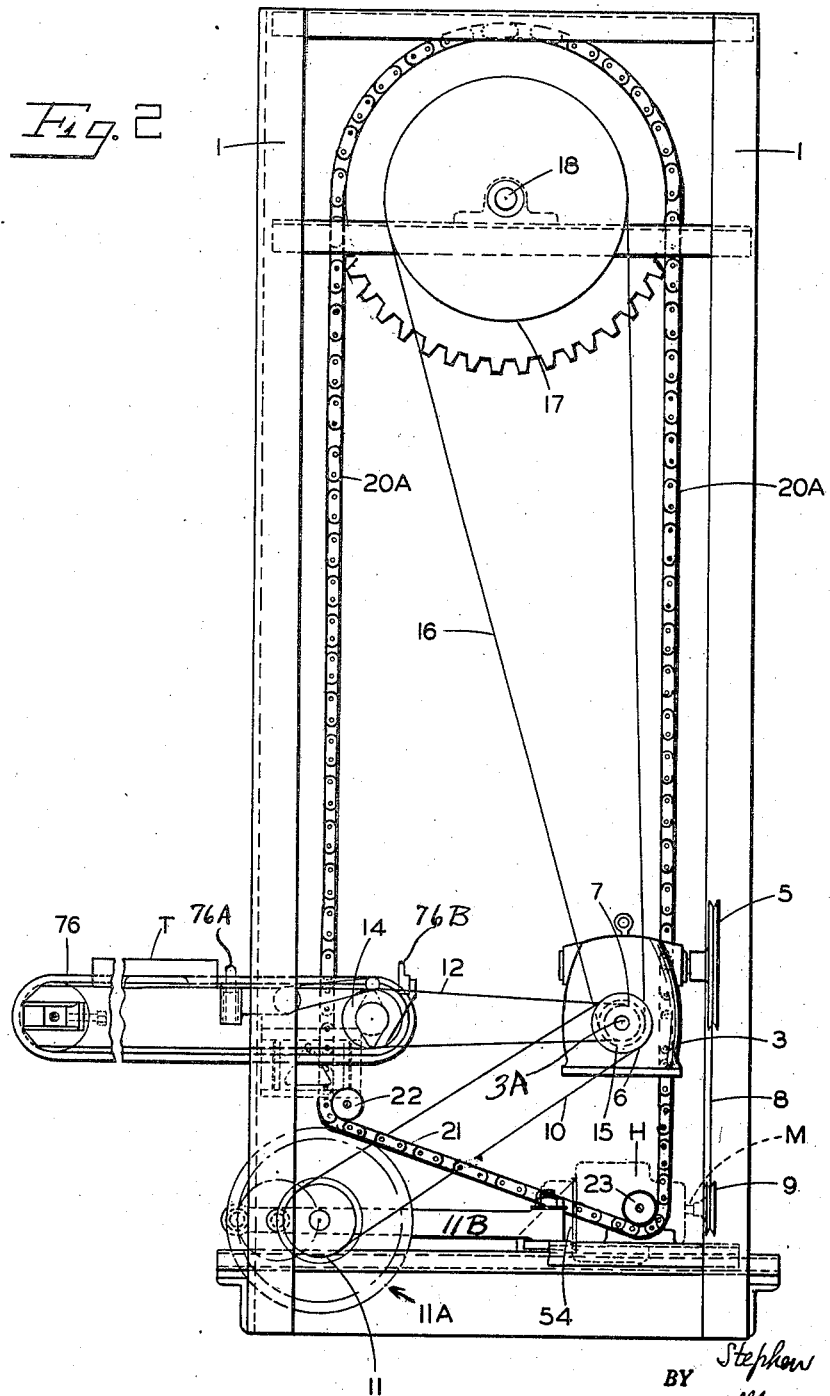
Fig. 2 is a side elevation of Fig. 1.
Figure 3:
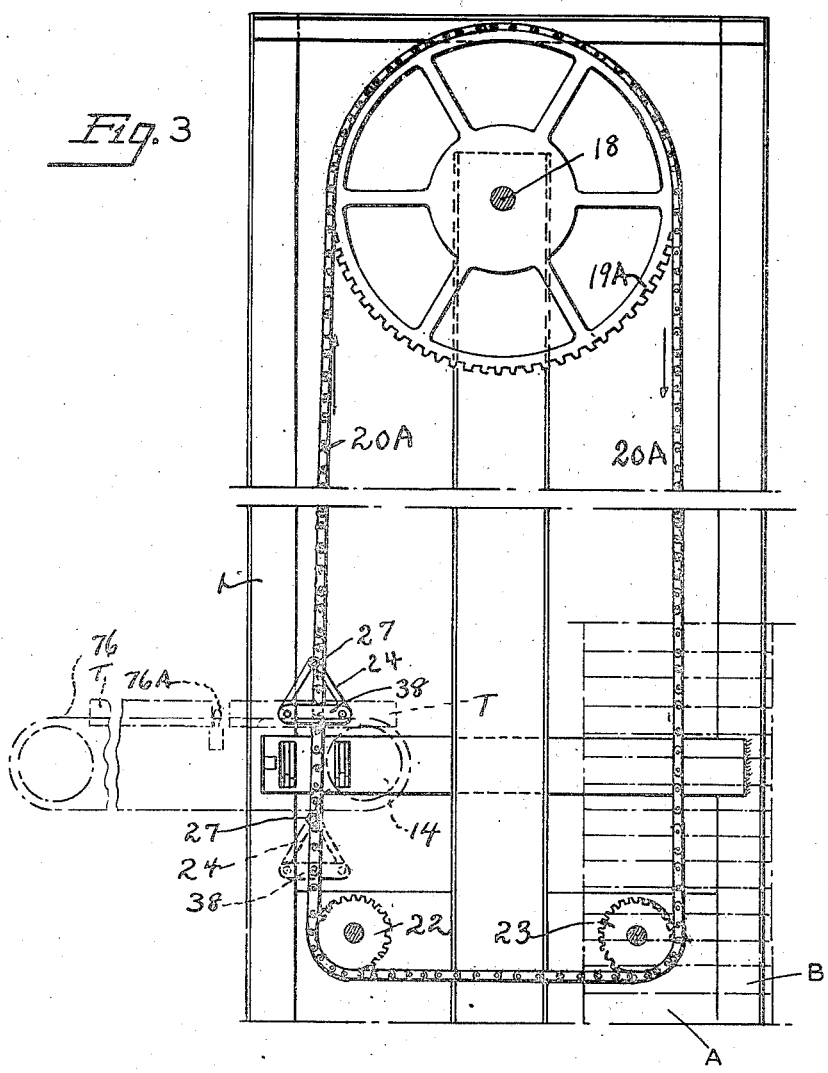
Fig. 3 is a section on the line 3—3 of Fig. 1, showing a slight modification, in which each conveyer chain has front and rear vertical runs; a top convex run and a bottom horizontal run; said runs of each chain being in the same vertical transverse plane.

Identical conveyer chains 20 and 20A have their respective top convex runs meshing respectively with sprockets 19 and 19A. Each chain 20 and 20A has a front, vertical, ascending run, and a rear, vertical, descending run. The vertical runs of each conveyer chain are located in the same transverse plane. The respective transverse planes in which said conveyer chains 20 and 20A operate, are parallel. Fig. 2 shows that each conveyer chain meshes with additional sprockets 22 and 23, so that each conveyer chain has a bottom inclined run 21, which is inclined downwardly from front to rear. This is an optional detail, because Fig. 3 shows that the bottom run of each conveyer chain is horizontal.

Fig. 1 shows a pair of laterally alined mounts or holders 24. Each holder 24 is turnably connected to a link of its respective conveyer chain, so that each holder 24 can turn to-and-fro, about a lateral axis which is parallel to the axis of shaft 18. The pairs of laterally alined holders 24 are provided along the conveyer chains 20 and 20A, at equally spaced intervals. Each holder 24 is located laterally inwardly, relative to the respective conveyer chain. As shown in Fig. 5, each holder 24 is provided with a pair of supporting rods or members 32, upon which a respective part of the respective tray is supported. Each tray T is supported upon four respective members 32. Each tray T is therefore always held horizontal, in the front and rear runs of the chains and also at the top runs of said conveyer chains. Each tray T and its two holders 24 can pass freely between the sprockets 19 and 19A, above the shaft 18, so that each tray T is maintained in a horizontal position, in the top runs of the chains 20 and 20A, as well as in the vertical runs of said chains.

Fig. 5 shows that each holder 24 is of triangular shape.

As further shown in Figs. 4 and 5, each holder has a top bearing-hub 28, which has a cylindrical bore which is parallel to the axis of shaft 18.

Figs. 14 and 15 show a coupling member 25, which is part of the means for fixing a holder 24 to a respective link of a conveyer chain. Each said coupling member 25 has a cylindrical shank 27, which has a reduced and threaded end-portion 29. Each cylindrical shank 27 fits in the cylindrical bore of a respective bearing-hub 28, so that each holder 24 can turn freely on its associated shank 27. This turnable assembly is maintained by a nut 30, as shown in Fig. 4.

As shown in Figs. 14 and 15, each said coupling member 25 has a bar-like body. Said bar-like body has parallel front and rear planar faces. The chains are provided at spaced intervals with links, each of which consists of two angular members 26B, as shown in Fig. 18. Each said angular member 26B has a leg 26A. Each leg 26A is clamped to the body of a respective coupling member 25, by a nut and bolt, as shown in Fig. 18. The shank of each bolt is located in a respective bore 26 of said bar-like body.

Each pair of members 26B has parallel legs 26C, which are connected by a pivot member 26D, which serves as a pivot connecting member for the next adjacent link of the conveyer chain.

An anti-friction roller R is turnably mounted on each pivot member 26D. The conveyer chain is of standard construction, so that further detailed description is unnecessary.

In this embodiment, each coupling member 25 is offset slightly relative to the pivot pins which connect the respective link, to the two next adjacent links. Each conveyer chain is under sufficient tension, so that such slight offset is not disadvantageous. Other standard chains are known, whereby the axis of shank 27 could be located on the vertical median line of the respective link, and I can use such standard alternative construction.

As shown in Fig. 4, a supplemental bearing member 34 is fixed to each holder 24. As shown in Fig. 23, each supplemental bearing member 34 has holes 32d, through which the shanks of respective screws can be passed, in order to fix each supplemental bearing member 34 to its holder 24. Each supplemental bearing member 34 has respective cylindrical bores 32B, which are laterally alined with respective cylindrical bores of the bottom flange 31 of the respective holder 24.

Two supporting rods or members 32 are slidably associated with each holder 24. Each supporting rod 32 is laterally slidable to-and-fro.

As shown in Fig. 19, each cylindrical rod 32 has a rounded end 32c, an integral cylindrical collar 33, and a reduced supporting end-portion 32A, which is also cylindrical, save where it is cut away to provide the bottom planar face 37. This cutting away gives greater clearance, during the stacking.

The cylindrical collars 33 of the rods 32 fit slidably in said cylindrical bores of the respective flange 31. As shown in Fig. 4, a compression spring 35 is located in each said bore of flange 31. One end of each compression spring 35 abuts a respective collar 33. The other end of each compression spring 35 abuts the end-wall of the respective bore of flange 31. Each compression spring 35 therefore biases the respective rod 32, laterally outwardly, towards an upright 1.

Fig. 4 and Fig. 21 show a clamping-mount 38, which is fixed to each pair of rods 32. Each clamping-mount 38 is located laterally inwardly relative to its holder 24. As shown in Fig. 21, each clamping-mount 38 has respective hubs 39 and 39A, which have cylindrical bores, in which the respective rods 32 are located. Said hubs 39 and 39A are fixed detachably to the respective rods 32, in any suitable manner. Each clamping-mount 38 may normally abut the respective transverse face of the respective holder 24, so that each spring 35 is maintained under initial biasing compression. Each clamping-mount 38 moves laterally in unison with its respective two rods 32.

As shown in Fig. 4, Fig. 5, and Fig. 21, each clamping-mount 38 is provided with a pair of depending lugs 45 and 45A, which have aligned lateral bores. As shown in Fig. 4 and Fig. 5, a pivot pin 46 is turnably located in the bores of each pair of said lugs 45 and 45A.

Fig. 22 shows a trigger 47, which has a notched head 49 and a tail 48. Each said trigger 47 is fixed to a respective pivot pin 46. Each trigger 47 is biased by gravity or by a spring to the horizontal position which is shown in broken lines in Fig. 4. A conventional stop may be provided, in order to prevent each trigger 47 from turning beyond said horizontal position.

Referring to Fig. 4, when each clamping-mount 38 is in the inoperative position which is shown in full lines in the lower part of Fig. 4 and to which it is biased by the respective two springs 35, the respective trigger 47 abuts the respective holder 24, so that the respective trigger 47 is held in the inclined position which is shown in Fig. 4 in full lines, with the respective tail 48 below the respective head 49.

Fig. 4 shows one of a laterally alined pair of cam-members 51, each of which is provided with a lower planar face 50 which is upwardly and inwardly laterally inclined, with an intermediate vertical planar face 53, and with a top planar face 52 which is inclined reversely to bottom planar face 50. The provision of the top planar face 52 is optional.

These cam-faces 50, 53, and 52 are provided in a recessed end-face of each cam-member 51.

The bottom of the setting station begins at the horizontal lateral line which connects the bottoms of the lower planar faces 50.

As shown in Fig. 4, Fig. 5, and Fig. 21, each clamping-mount 38 has an upstanding vertical arm 40, which is provided with a vertical recess 41, whose end-wall has a hole 44. Fig. 20 shows one of the angular clamping springs 42. Each clamping spring 42 has a perforated leg 43, which fits in a respective recess 41. A suitable bolt or rivet clamps each clamping spring 42 to its respective arm 40. The bent clamping springs 42 extend laterally inwardly towards each other, from their arms 40.

The rods 32 are moved to the broken line operative position shown in Fig. 4, below the loading station at which a tray is loaded on four respective rods 32. Hence, when a tray is thus loaded, the respective two springs 42 are already in clamping position. These springs 42 are bent away from each other when a tray is loaded by sliding it horizontally into position, so that said two bent springs 42 then resiliently clamp the respective tray.

At the bottom of the setting station, the rounded ends 32C of the respective rods 32 contact with the inwardly inclined cam-faces 50, so that the respective rods 32 of the respective holders 24 are pushed laterally inwardly towards each other, against the force of the four respective biasing springs 35, while the two front runs of the conveyer chains are moved upwardly. The broken-line position of the rod 32 in Fig. 4 shows the limit of its respective lateral inward movement. Each trigger 47 is thus freed from the respective holder 24, so that each trigger is turned to and held in the horizontal position which is shown in broken lines in Fig. 4, by the biasing force of gravity or a spring. The end-wall of the tail 48 of each trigger is then very close to the respective planar transverse wall of the respective holder 24. When the rods 32 rise above the tops of the vertical faces 53, the springs 35 laterally outwardly force the four rods 32. The end-face of each tail 48 is thus firmly pressed against the respective holder 24, so that the triggers 47 remain in the operative positions which are indicated by broken lines in Fig. 4, until the respective tray is unloaded. The triggers 47 can be thus set, at the tops of cam-faces 50.

The second embodiment of the means for supporting the trays T will now be described.

Fig. 7 and Fig. 11 show a holder frame 63 which has vertical legs 63A which are separated by a vertical space 70. As shown in Fig. 13, the bottoms of legs 63A are connected to a T-shaped insert 63B.

As shown in Fig. 12, each leg 63A has an angular horizontal cross-section. Intermediate the top and bottom of holder frame 63, said legs 63A are integral with lateral hubs 64, and with another hub 80. Hubs 64 have laterally alined cylindrical bores 65, and hub 80 has a cylindrical bore 81, which is located centrally between legs 63A.

Fig. 16 shows the coupling member 60 which is used in the second embodiment. This is similar to the coupling member 25 of the first embodiment. Coupling member 60 has a cylindrical shank 83, a threaded and reduced end-portion 85, and bores 61. The shank 83 is located in the bore 81 of a respective hub 80, so that the respective holder frame 63 is freely turnable relative to shank 83. This turnable assembly is maintained by a nut which is screwed upon end-portion 85. The coupling member 60 is clamped to a link which consists of a pair of members 26B, as in the first embodiment. In each embodiment, the respective holder can be turnably mounted upon a pivot which turnably connects a pair of links of the conveyer chain.

Figs. 8 and 9 show a supporting frame 55, which is pivoted to frame 63, by means of a pivot pin 66 which is located in the bores 65 of hubs 64, and in the transversely alined bores 60a of bearings 59 of frame 55. A biasing compression spring 68 has its ends located in respective recesses 62 and 69 of frames 55 and 63.

Each supporting frame 55 is provided with a pair of supporting lugs 58, for supporting the respective part of the respective tray T. Each frame 55 also has a pair of rolls 75 turnably mounted on studs which are fixed to said frame 55. Each frame 55 is also provided with depending lugs 56, which have alined bores 57. The latch 71 which is shown in Fig. 17 has a head 73 and a tail 72, and a bore 74. A latch 71 is pivotally connected to each pair of lugs 56, by means of a pivot pin which is located in the respective bore 74, and in the respective bores 57.

As in the first embodiment, gravity or a spring biases each latch 71 to a horizontal position, said position being shown in full lines in Fig. 7. A stop is provided to prevent each latch 71 from turning beyond said horizontal position.

The rolls 75 ride against the cam faces 50, 53 and 52 which are shown in Fig. 4, because the cam-members 51 are also used in the second embodiment.

Below the locking station and the loading station in the front runs of the chains, the position of each supporting frame 55 relative to its holder frame 63 is shown in broken lines in Fig. 7.

At the loading station, each supporting frame 55 is located as shown in full lines in Fig. 7. Hence, when a tray is slid horizontally into position, the two respective supporting frames 55 have been pre-set into the full-line position of Fig. 7.

As the front runs of the chains are moved upwardly, the two pairs of rolls 75 contact with the two cam-faces 50, so that the top of each supporting frame 55 is forced towards the top of its companion holder frame 63, thus compressing the two respective springs 68. This permits each respective latch 71 to turn to the full line position shown in Fig. 7. When the rolls 75 pass above the cam-faces 50, the end-walls of the tails 72 of the triggers 71 abut the inserts 63B of the frames 63, so that each frame 55 is held locked in the full-line pick-up position of Fig. 7.

Each tray is held clamped between a pair of supporting frames 55. For this purpose, each supporting frame 55 can optionally be provided with a clamping spring of the type shown in Fig. 20.

Fig. 7 illustrates the automatic unloading and stacking of the trays, at the rear vertical runs of the chains 20 and 20A. The top tray of the previously stacked, vertical pile of trays is shown in position A. The position of the next tray, which is to be released from the two respective supporting frames 55, is indicated by the reference letter B. As the two respective frames 55 are lowered to the unloading position, the heads 73 of the two respective triggers 71 strike against the transverse edges of the tray in the "A" position. Each trigger 71 is thus turned to the inclined position, which is illustrated in Fig. 7. Each compression spring 68 and the force of gravity will then turn the respective supporting frame 55 to the broken-line release position which is shown in Fig. 7, so that the tray in the "B" position will be released from the four respective lugs 58. Each tray is thus piled on top of the vertical pile of trays, with little or no shock. When the bottom tray of the pile is to be released from the two respective frames 55, the heads 73 of the two respective triggers 71 will strike against the transverse edges of the unloading or receiving platform on which the trays are vertically stacked. Said platform can be of smaller dimensions than the trays, so that the first or bottom tray is unloaded on said platform, without moving the supporting frames 55 to said broken-line position.

In order to unload the trays from the rods 32, in the first embodiment, the heads 49 of triggers 47 strike against the respective transverse edges of the last-unloaded tray. This turns the triggers 47 to their inclined positions, so that compression springs 35 can move the rods 32 to their release positions, in which said rods 32 release the respective tray. As in the second embodiment, the rods 32 can be maintained in their inner positions, in unloading the bottom tray of the stack.

Fig. 2 shows an electric motor H which has a shaft M. Said shaft M is coupled by pulley 9, belt 8, and pulley 5, to the high-speed shaft of a speed-reducing mechanism which is located in casing 3. This speed-reducing mechanism is not shown, because it is conventional and well-known per se. Said speed-reducing mechanism has a slow-speed shaft 3A, whose ends project from casing 3.

Slow-speed shaft 3A is coupled to shaft 18 by sprockets 15 and 17 and chain 16.

The trays T are fed to the front ascending runs of the conveyer chains 20 and 20A, by conventional feeding mechanism which includes an endless feed-belt 76. Said feed-belt 76 is located on two pulleys. The shaft of one of said pulleys has a sprocket 14, which is coupled by chain 12 to sprocket 7 of slow-speed shaft 3A.

Said feed-mechanism has the conventional movable stop 76A, which is moved down in order to permit a tray T to be fed upon the conveyer chains by the frictional drive of belt 76. Said stop 76A is then moved up, in order to prevent the feeding of the next tray. This stop 76A is moved up-and-down at recurrent intervals, in the usual manner.

The feeding mechanism also includes the usual fixed stops 76B, which prevents the over-feeding of a tray T, so that each tray T is fed into proper position at the loading station.

After the stack of unloaded trays has reached a predetermined height, the machine automatically pushes said stack of trays off the unloading or receiving platform, to a conveyer of any suitable type.

For this purpose, I provide a single-revolution clutch 11A of any conventional type, such as the "Hilliard" single-revolution clutch. This single-revolution clutch 11A includes a sprocket 11, which is coupled to slow-speed shaft 3A by chain 10 and sprocket 6.

When clutch 11A is tripped, it moves the pusher-arm 11B in a single reciprocation. The pusher-arm 11B is pivotally connected to a pusher 54. When the clutch 11A is thus tripped, pusher 54 is moved to the right of its position which is shown in Fig. 2, in order to push the stack of piled trays off the unloading platform, and pusher 54 is then moved back to said position, and its movement is then stopped until clutch 11A is again tripped.

Fig. 1 shows the location of a switch S which controls the single-revolution clutch 11A. When switch S is closed, said clutch 11A is tripped, in order to impart a single reciprocation to pusher 54, as previously stated. Switch S is closed when its arm Sa is moved to touch contact Sb, by one of the descending rods 32.

Referring to the first embodiment, as each tray T is unloaded, the respective four rods 32 are released by the respective two triggers 47, so that said four rods 32 are moved to their full-line positions which are shown in Fig. 4, by the respective four compression springs 35. This movement is transverse to the plane of the paper in Fig. 1.

Switch S is located at a suitable height above the unloading platform, so that when the top tray of the stack is unloaded upon the top of said stack, a respective rod 32 will close switch S, as the top tray is unloaded from the conveyer chains to the top of the stack.

Immediately after said top tray is thus deposited upon the top of the stack, the one-revolution clutch 11A is tripped, so that the pile of stacked trays is pushed off the unloading platform.

The arm Sa of switch S is biased to the circuit-opening position, so that it will open the control circuit of clutch 11A, as soon as the respective rod 32 is moved below its switch-actuating position.

Said switch S and its control circuit are conventional per se, so that they require no detailed illustration.

Since the switch S is operated only once, during each removal of a pile of stacked trays, there is minimum sparking at the contact Sb of said switch.

In the second embodiment, the switch S is operated by the movement of a holding frame 55 to the release position which is shown in broken lines in Fig. 7, when said frame 55 and its companion frame deposit the top tray of a stack, upon the top of said stack.

I have disclosed preferred illustrative embodiments of my invention, but numerous changes and omissions and additions can be made without departing from its scope. The scope of the invention includes the sub-combinations disclosed herein, in addition to the entire mechanism.

In each embodiment, the ascending and parallel vertical runs of the conveyer chains have respective pairs of holders which are directed laterally towards each other between said runs. Each holder comprises a member 24 or 63 which is connected to the respective run, and movable supporting means 32 or 55. The supporting means 32 or 55 of one run are movable laterally towards and away from the other respective run. The supporting means 32 and 55 are biased to inoperative position by respective springs 35 and 68. The machine has automatic setting means, exemplified by the cam members 51 but not limited thereto, which set the movable supporting means to operative position below the loading station. Each said holder has automatic means for maintaining the respective supporting means in operative position, as exemplified by a latch which is movably connected to the respective holder and which is biased to operative position. In the illustrations disclosed herein, each latch is pivotally associated with the respective supporting means, even though there is no direct pivotal connection between the supporting means and the latch. Each latch is moved back into inoperative position when an upward force is exerted thereon.

I claim:

1. In a machine for stacking objects, a pair of endless conveyor chains which have respective ascending runs which are parallel to each other, said machine having a loading station between the tops and bottoms of said ascending runs, means to actuate said chains in unison, said chains having respective pairs of holders, said holders being directed laterally towards each other between said runs, each said holder comprising a member which is connected to the respective run and movable supporting means which are movable laterally towards and away from the other respective run, the movable supporting members of each said pair being constructed and shaped to hold a respective object intermediate said runs when said supporting means are in operative position, biasing means which bias said supporting means to inoperative position, said machine having automatic setting means which are operative to force said supporting means into operative position below said loading station so that said supporting means pick up said object at said loading station, each said holder having automatic means for maintaining the respective supporting means in operative position, said automatic means comprising a latch which is movably connected to the respective holder, said latch being biased to move into operative position and being moved into operative position when said supporting means are moved to operative position, each said latch being moved to its inoperative position when an upward force is exerted thereon.

2. A machine according to claim 1 in which each said latch is pivotally associated with said supporting means; each said latch being located intermediate the respective holder and its respective supporting means when said latch is in operative position, each said latch then holding the respective supporting means against the biasing means which bias the respective supporting means to inoperative position.

3. In a machine for stacking objects, endless conveyor means which have an ascending portion and a descending portion, actuating means to actuate said conveyor means in an endless path, said machine having a loading station at said ascending portions, said machine having pick-up holder-devices for picking up the objects, said holder-devices being arranged in laterally alined pairs, each holder-device comprising a holder member which is connected to said conveyor means and supporting means which are movable relative to the respective holder-member, said supporting means being laterally movable towards each other to operative positions to pick up an object and being laterally movable away from each other to inoperative positions to release the respective picked-up object, said supporting means being biased to inoperative position, automatic setting means which actuate said supporting means to operative position below said loading station so that each pair of holder-devices picks up a respective object at said loading station, each said holder-device having a latch which is movable relative to the respective holder-device and which is biased to latching position to hold the respective supporting means in operative position when said supporting means are thus actuated into operative position, an unloading support for supporting the released and stacked objects, said support being located at said descending portions, each said latch being located to contact with the next preceding object which is supported on said unloading support, said contact moving said latch to unlatching position.

4. A machine according to claim 3 which has a pusher for pushing the stacked objects off said unloading support, said machine having push mechanism for actuating said pusher, said push mechanism having a control member which is located above said unloading support, said push mechanism being actuated to operate said pusher in a single stroke when said control member is actuated, said control member being located to be actuated by a respective supporting means when said respective supporting means is moved to inoperative position to release the top object of said stack.

5. In a stacking machine, the sub-combination of a conveyer, a holder-device connected to said conveyer, said holder-device comprising a holder member which is connected to said conveyer and a supporting member which is movably connected to said holder member, said supporting member being movable relative to said holder member to an operative supporting position and being also movable relative to said holder member to an inoperative position, said supporting-member being biased to its inoperative position, a latch movably associated with said supporting member so that said latch and said supporting member are movable in unison relative to said holding member, said latch being biased to an operative latching position in which it abuts said holder-member to maintain said supporting member in predetermined operative position relative to said holder-member.

STEPHEN P. MATHERS.